United States Patent
Chung et al.

(10) Patent No.: US 11,606,055 B2
(45) Date of Patent: Mar. 14, 2023

(54) ROTARY MACHINE DEVICE AND LINEAR MACHINE DEVICE

(71) Applicant: Delta Electronics, Inc., Taoyuan (TW)

(72) Inventors: Chi-Wen Chung, Taoyuan (TW); En-Yi Chu, Taoyuan (TW)

(73) Assignee: DELTA ELECTRONICS, INC., Taoyuan (TW)

( * ) Notice: Subject to any disclaimer, the term of this patent is extended or adjusted under 35 U.S.C. 154(b) by 34 days.

(21) Appl. No.: 17/345,998

(22) Filed: Jun. 11, 2021

(65) Prior Publication Data
US 2022/0158579 A1 May 19, 2022

(30) Foreign Application Priority Data

Nov. 19, 2020 (CN) .......................... 202011304559.5

(51) Int. Cl.
*H02P 23/14* (2006.01)
(52) U.S. Cl.
CPC .................................... *H02P 23/14* (2013.01)
(58) Field of Classification Search
CPC ................................ H02P 23/14; H02P 23/18
USPC .................................................. 318/474, 445
See application file for complete search history.

(56) References Cited

U.S. PATENT DOCUMENTS

| | | | | |
|---|---|---|---|---|
| 7,852,025 B2 * | 12/2010 | Crane | ....................... | H02P 8/00 318/700 |
| 7,891,468 B2 * | 2/2011 | Tsubouchi | ............ | B60T 11/046 73/862.473 |
| 8,508,171 B2 * | 8/2013 | Miyaji | ................. | G05B 19/404 318/632 |
| 9,377,773 B2 * | 6/2016 | Hashimoto | .......... | G05B 19/404 |
| 10,014,753 B2 | 7/2018 | Mukai | | |

FOREIGN PATENT DOCUMENTS

| | | |
|---|---|---|
| CN | 102893514 A | 1/2013 |
| CN | 107538494 A | 1/2018 |
| CN | 108884884 A | 11/2018 |
| CN | 110058524 A | 7/2019 |
| JP | S6018734 A | 1/1985 |
| JP | S6123932 A | 2/1986 |
| JP | H05281244 A | 10/1993 |
| JP | H0661465 U | 8/1994 |
| JP | 2021128032 A | 9/2021 |

(Continued)

*Primary Examiner* — David Luo
(74) *Attorney, Agent, or Firm* — Kirton McConkie; Evan R. Witt

(57) ABSTRACT

A rotary machine device configured to contact with an external object is provided. The rotary machine device includes a rotary motor, a first encoder, a fixed housing, a fixed shaft, an output shaft and a second encoder. The rotary motor includes a motor housing and an exerting shaft. As the rotor of the motor housing rotates for a rotation angle, the rotor drives the exerting shaft to rotate for an exerting angle. The first encoder detects the rotation angle of the rotor. The output shaft includes an elastomer and is inserted in an accommodation hole of the fixed shaft. The elastomer is penetrated through the output shaft and is connected to the exerting shaft. The second encoder includes a disk and a sensor disposed on the exerting shaft and the fixed shaft respectively. The sensor detects the exerting angle of the exerting shaft through the disk.

20 Claims, 8 Drawing Sheets

(56) References Cited

FOREIGN PATENT DOCUMENTS

| TW | 201811500 A | 4/2018 |
| TW | I628898 B | 7/2018 |
| TW | I663813 B | 6/2019 |
| WO | 2016042636 A1 | 3/2016 |

* cited by examiner

ROTARY MACHINE DEVICE AND LINEAR MACHINE DEVICE

CROSS-REFERENCE TO RELATED APPLICATION

This application claims priority to China Patent Application No. 202011304559.5, filed on Nov. 19, 2020. The entire contents of the above-mentioned patent applications are incorporated herein by reference for all purposes.

FIELD OF THE INVENTION

The present disclosure relates to a rotary machine device and a linear machine device, and more particularly to a rotary machine device and a linear machine device with encoders.

BACKGROUND OF THE INVENTION

Nowadays, for satisfying the requirements of the automatic system, the output force from the machine device is required to be more and more accurate. Therefore, a force sensor is usually disposed at the exerting end for monitoring the magnitude of the force applied. Conventionally, the force sensor performs the force sense through the strain gauge attached on the elastomer. In specific, when the elastomer is deformed by the applied force, the deformation of the elastomer is sensed by the strain gauge, and the magnitude of the applied force can be calculated according to the deformation and the elastic coefficient. However, the strain gauge requires the wiring connected therewith, and the elastomer has to contact with the exerting end, which limits the application environment. In addition, a space on the elastomer should be provided for allowing the strain gauge to attach on, and the process of attaching the strain gauge on the elastomer is complicated. Consequently, the space required for attaching process is large, it may be complicated for structure design, and the processing cost is high.

Therefore, there is a need of providing a machine device to obviate the drawbacks encountered from the prior arts.

SUMMARY OF THE INVENTION

It is an objective of the present disclosure to provide a rotary machine device and a linear machine device. The force applied on the output shaft is sensed through disposing the elastomer and encoders, which is simpler for structure design and requires lower processing cost. Further, compared with the conventional approach of performing the force sense through attaching the strain gauge, the machine devices of the present disclosure require smaller space while disposing the elastomer and encoders.

In accordance with an aspect of the present disclosure, there is provided a rotary machine device. The rotary machine device is configured contact with an external object. The rotary machine device includes a rotary motor, a first encoder, a fixed housing, a fixed shaft, an output shaft and a second encoder. The rotary motor includes a motor housing and an exerting shaft. The motor housing includes a stator and a rotor. The exerting shaft includes a connection part. The stator is connected to the rotor. The exerting shaft is disposed on the motor housing and is connected to the rotor. The rotor drives the exerting shaft to rotate for an exerting angle as the rotor rotates for a rotary angle. The first encoder is disposed on the motor housing, connected to the stator, and configured to detect the rotary angle of the rotor. The fixed housing is connected to the motor housing and is around the exerting shaft. The fixed shaft includes an accommodation hole, and the fixed shaft is connected to the fixed housing and is corresponding to the exerting shaft. The output shaft includes an elastomer and is inserted in the accommodation hole. The elastomer is penetrated through the output shaft, and an end of the elastomer is connected to the connection part of the exerting shaft. The second encoder includes a disk and a sensor. The disk is disposed on the exerting shaft and is around the connection part. The sensor is disposed on the fixed shaft, and the sensor is corresponding in space to the disk. The sensor detects the exerting angle of the exerting shaft through the disk.

In accordance with an aspect of the present disclosure, there is further provided a rotary machine device. The rotary machine device is configured contact with an external object. The rotary machine device includes a rotary motor, a first encoder, a power transmission device, an exerting shaft, a fixed housing, a fixed shaft, an output shaft and a second encoder. The rotary motor rotates for a rotary angle to provide a first torque. The first encoder detects the rotary angle of the rotary motor. The power transmission device is connected to the rotary motor, and the power transmission device increases the first torque to generate a second torque. The exerting shaft includes a connection part. The exerting shaft is disposed on a housing of the power transmission device. The second torque generated by the power transmission device drives the exerting shaft to rotate for an exerting angle. The fixed housing is connected to the housing of the power transmission device and is around the exerting shaft. The fixed shaft includes an accommodation hole. The fixed shaft is connected to the fixed housing and is corresponding to the exerting shaft. The output shaft includes an elastomer and is inserted in the accommodation hole. The elastomer is penetrated through the output shaft, and an end of the elastomer is connected to the connection part of the exerting shaft. The second encoder includes a disk and a sensor. The disk is disposed on the exerting shaft and is around the connection part. The sensor is disposed on the fixed shaft, and the sensor is corresponding in space to the disk. The sensor detects the exerting angle of the exerting shaft through the disk.

In accordance with an aspect of the present disclosure, there is further provided a linear machine device. The linear machine device is configured to contact with an external object. The linear machine device includes a linear motor, a support bracket, a first encoder, an elastic element, an output shaft and a second encoder. The linear motor includes a stator housing and a rotor housing. The stator housing is connected to a first side of the rotor housing. The rotor housing includes a linear rotor and an exerting unit. The exerting unit is disposed on a second side of the rotor housing, and the first side is perpendicularly connected to the second side. A third side of the rotor housing is partially attached on a surface of the support bracket directly. The exerting unit is not contacted with the surface of the support bracket. The linear rotor drives the exerting unit to move a linear displacement simultaneously when the linear rotor moves the linear displacement. The linear displacement is perpendicular to the surface of the support bracket. The third side is perpendicularly connected to the second side, and the third side is opposite to the first side. The first encoder is connected to the stator housing for detecting the linear displacement of the linear rotor. A first end of the elastic element is connected to the exerting unit. A first end of the output shaft is connected to a second end of the elastic element. The second encoder includes a scale and a sensor.

The scale is disposed on the output shaft, the sensor is disposed on a side surface of the support bracket, and the sensor is corresponding in space to the scale. The sensor detects a displacement of the output shaft through the scale.

DETAILED DESCRIPTION OF THE PREFERRED EMBODIMENT

The present disclosure will now be described more specifically with reference to the following embodiments. It is to be noted that the following descriptions of preferred embodiments of this disclosure are presented herein for purpose of illustration and description only. It is not intended to be exhaustive or to be limited to the precise form disclosed.

Figure 1A:
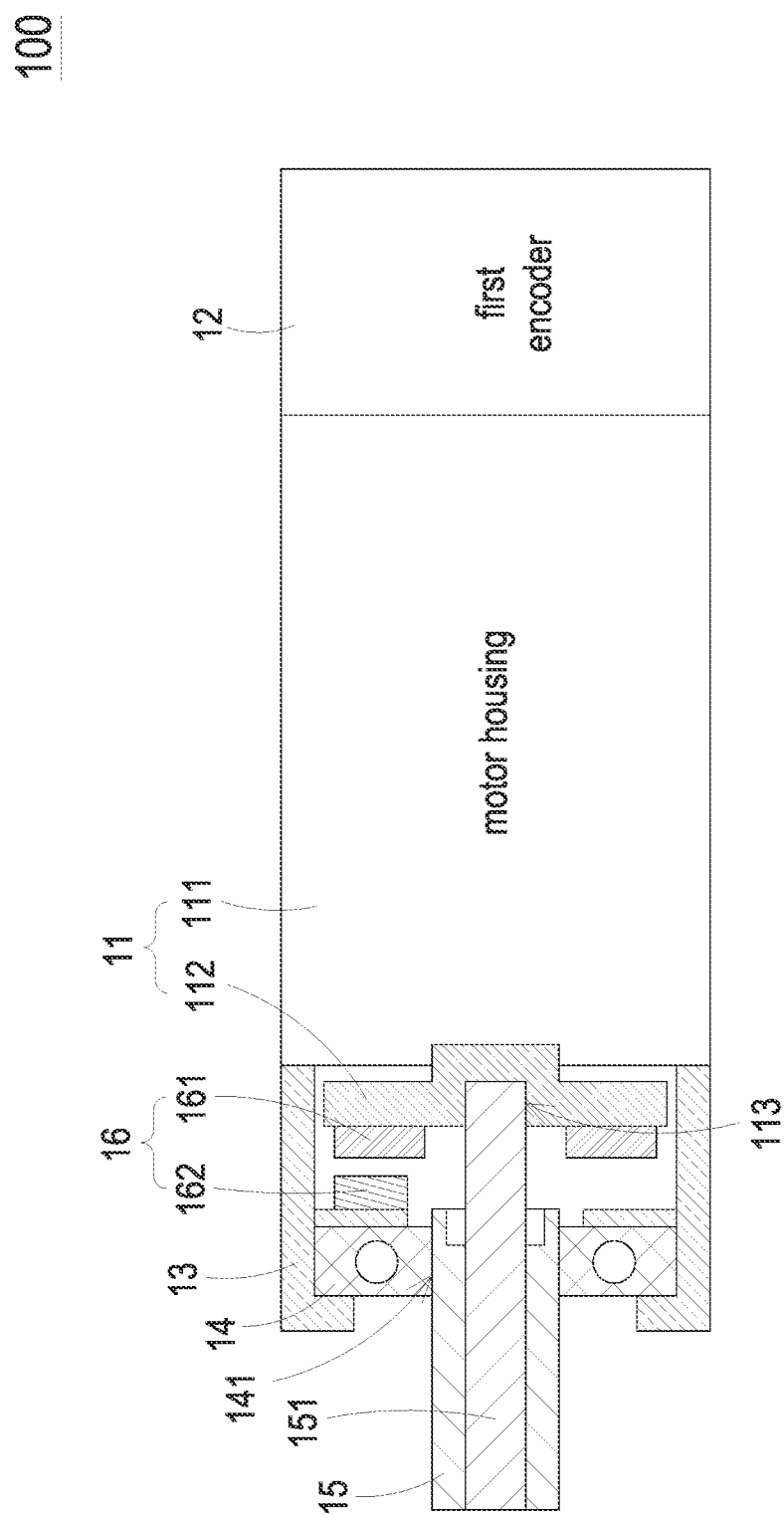
FIG. 1A is a schematic cross-sectional view illustrating a rotary machine device according to a first embodiment of the present disclosure.
Figure 1B:
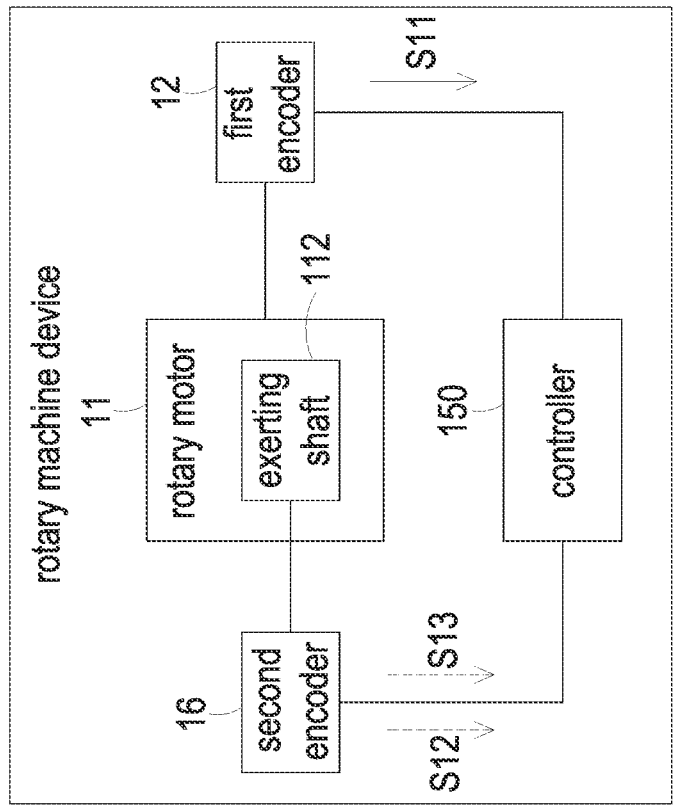
FIG. 1B is a schematic block diagram illustrating the rotary machine device according to the first embodiment of the present disclosure.

FIG. 1A is a schematic cross-sectional view illustrating a rotary machine device according to a first embodiment of the present disclosure. FIG. 1B is a schematic block diagram illustrating the rotary machine device according to the first embodiment of the present disclosure. In the first embodiment, as shown in FIG. 1A and FIG. 1B, the rotary machine device 100 includes a rotary motor 11, a first encoder 12, a fixed housing 13, a fixed shaft 14, an output shaft 15 and a second encoder 16. The output shaft 15 of the rotary machine device 100 is configured to contact with an external object (not shown). The rotary motor 11 includes a motor housing 111 and an exerting shaft 112. The motor housing 111 includes a stator (not shown) and a rotor (not shown). The exerting shaft 112 has a connection part 113. The stator is connected to the rotor, and the exerting shaft 112 is disposed on the motor housing 111 and is connected to the rotor. As the rotor rotates for a rotary angle, the rotor drives the exerting shaft 112 to rotate for an exerting angle simultaneously. The first encoder 12 is disposed on the motor housing 111 and is connected to the stator, and the first encoder 12 detects the rotary angle of the rotor. The fixed housing 13 is connected to the motor housing 111 and is around the exerting shaft 112. The fixed shaft 14 includes an accommodation hole 141, and the fixed shaft 14 is connected to the fixed housing 13 and is corresponding to the exerting shaft 112. The output shaft 15 includes an elastomer 151 and is inserted in the accommodation hole 141. The elastomer 151 is penetrated through the output shaft 15, and an end of the elastomer 151 is connected to the connection part 113 of the exerting shaft 112. The elastomer 151 is for example but not limited to be formed in one piece with the output shaft 15 or be rigidly connected to the output shaft 15. The second encoder 16 includes a disk 161 and a sensor 162. The disk 161 is disposed on the exerting shaft 112 and is around the connection part 113, and the sensor 162 is disposed on the fixed shaft 14. The sensor 162 is corresponding in space to the disk 161, and the sensor 162 detects the exerting angle of the exerting shaft 112 through the disk 161. The first encoder 12 and the second encoder 16 are for example but not limited to optical encoders or magnetic encoders. In the case that the output shaft 15 is not contacted with the external object, the exerting shaft 112 drives the output shaft 15 through the elastomer 151 to rotate for the exerting angle when the rotor drives the exerting shaft 112 to rotate for the exerting angle. When the output shaft 15 is contacted with the external object and is fixed, the end of the elastomer 151 connected with the connection part 113 reduces the exerting angle of the exerting shaft 112 to a stop angle.

In an embodiment, the rotary machine device 100 further includes a controller 150, and the controller 150 is configured to sense the motor current of the rotary motor 11. The controller 150 of the rotary machine device 100 is electrically coupled to the first encoder 12 and the second encoder 16. The first encoder 12 detects the rotary angle of the rotor in the motor housing 111 and outputs a first position signal S11 to the controller 150 accordingly. The controller 150 calculates an angular acceleration of the rotor according to the first position signal S11. The sensor 162 of the second encoder 16 detects the exerting angle and outputs a second position signal S12 to the controller 150 accordingly. Alternatively, the sensor 162 detects the stop angle and outputs a third position signal S13 to the controller 150 accordingly.

In specific, when the output shaft 15 is not contacted with an external object, the rotation of the exerting shaft 112 would not be limited by the end of the elastomer 151 which is connected to the connection part 113. Therefore, as the rotor in the motor housing 111 rotates for a rotary angle, the rotor can drive the exerting shaft 112 to rotate for an exerting angle. Meanwhile, the sensor 162 detects the exerting angle and outputs the second position signal S12 accordingly. On the contrary, when the output shaft 15 is contacted with an external object, the rotation of the exerting shaft 112 would be limited by the end of the elastomer 151 which is connected to the connection part 113. Therefore, even if the rotor in the motor housing 111 rotates for a rotary angle, the rotor can drive the exerting shaft 112 to rotate for a stop angle only. Meanwhile, the sensor 162 detects the stop angle and outputs the third position signal S13 accordingly.

If the controller 150 determines that the angular acceleration and the motor current are in direct proportion, the controller 150 determines that the output shaft 15 is not contacted with an external object, and the controller 150 records the second position signal S12 as an initial position of the exerting shaft 112. In specific, when the output shaft 15 is not contacted with an external object, the variation of the motor current would affect the angular acceleration directly. Accordingly, the angular acceleration of the rotor increases as the motor current increases, and the angular acceleration decreases as the motor current decreases. In other words, the angular acceleration and the motor current are in direct proportion. If the controller 150 determines that the angular acceleration does not increase as the motor current increases, the controller 150 knows that the output shaft 15 is affected by external force. Therefore, the controller 150 determines that the output shaft 15 is contacted with an external object, and the controller 150 records the third position signal S13 as a stop position of the exerting shaft 112. According to the difference between the initial position and the stop position, the controller 150 calculates the torsion value of the output shaft 15. The torsion value of the output shaft 15 equals the product of the elastic coefficient of the elastomer 151 and the difference between the initial and stop positions. The elastic coefficient of the elastomer 151 may be preset in the controller 150. If the controller 150 determines that the torsion value is higher than a safety threshold, the controller 150 reduces the rotary angle of the rotor or stops operating the rotary motor 11 so as to protect the external object from being damaged by the excessive force from the rotary machine device 100. In an embodiment, the external object may be a chip, an integrated circuit or a wafer, but not exclusively.

Consequently, the force applied on the output shaft 15 can be sensed through disposing the elastomer 151 and the encoders 12 and 16, which is simpler for structure design and requires lower processing cost. Further, compared with the conventional approach of performing the force sense through attaching the strain gauge, it requires smaller space while disposing the elastomer 151 and encoders 12 and 16. In addition, the disk 161 and the sensor 162 of the second encoder 16 are disposed on the exerting shaft 112 and the fixed shaft 14 respectively, and only the sensor 162 has the wiring connected to the controller 150. Therefore, the exerting shaft 112 can rotate without being limited by the wiring.

In addition, when the distance between the output shaft 15 and the external object is larger than a default, the motor current and the angular acceleration are allowed to vary freely. However, when the distance between the output shaft 15 and the external object is smaller than the default, the output shaft 15 is prepared to contact with the external object, and the motor current and the angular acceleration should be limited within a smaller specific range.

In an embodiment, an outer diameter of the disk 161 is larger than an outer diameter of the elastomer 151, thereby causing the effect of enlarging the deformation of the elastomer 151. Therefore, it is easier to sense the deformation of the elastomer 151. Further, compared with the conventional approach of performing the force sense through attaching the strain gauge, the elastomer 151 of the present disclosure has better structure rigidity under the condition of same deformation.

Figure 2A:
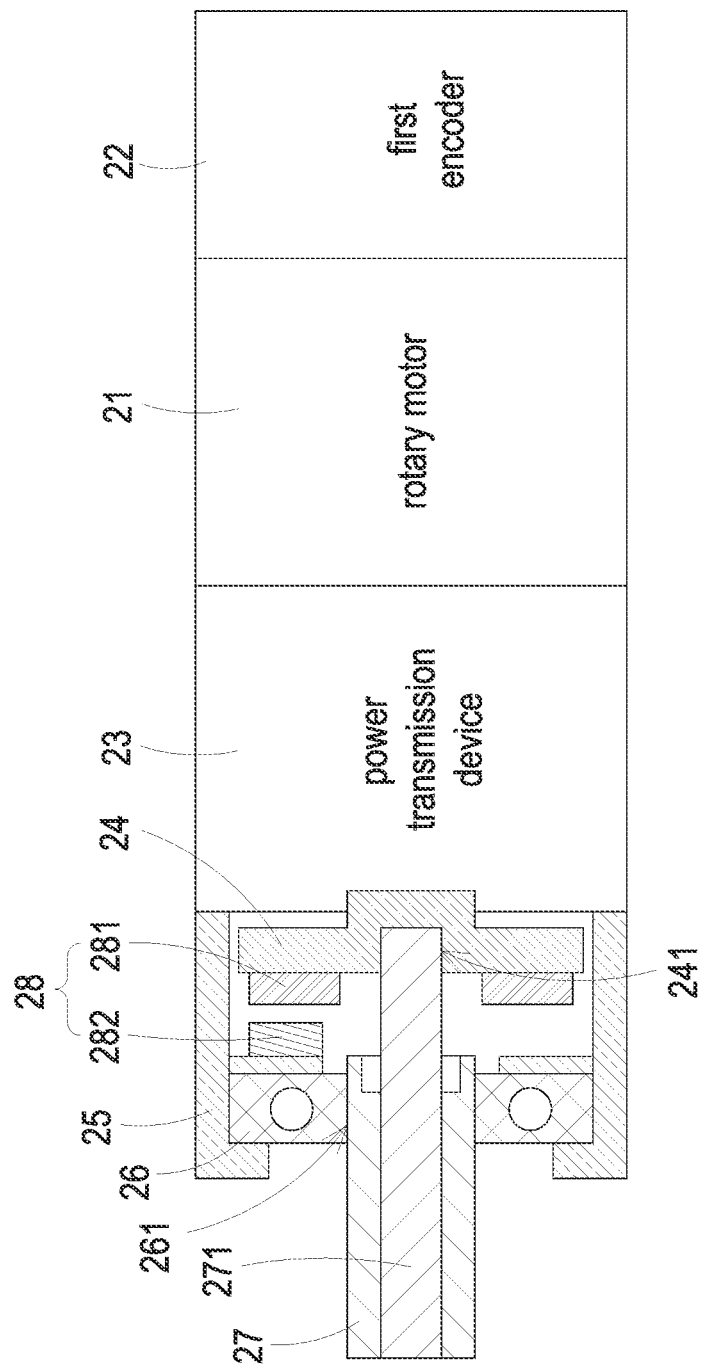
FIG. 2A is a schematic cross-sectional view illustrating a rotary machine device according to a second embodiment of the present disclosure.
Figure 2B:
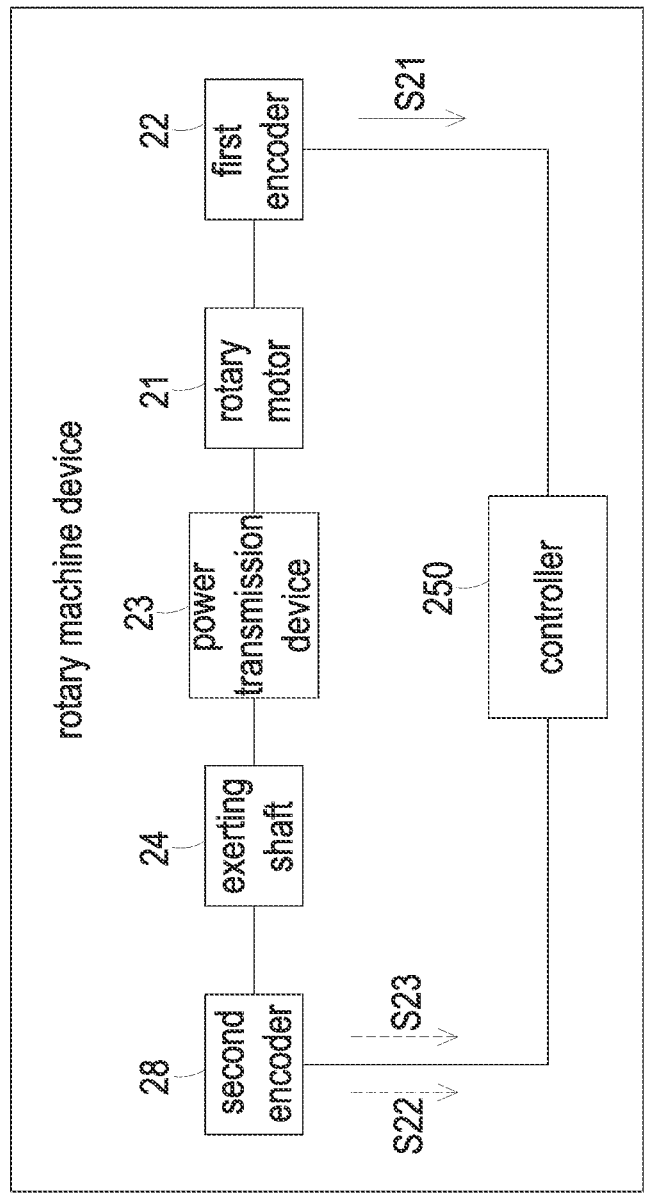
FIG. 2B is a schematic block diagram illustrating the rotary machine device according to the second embodiment of the present disclosure.

FIG. 2A is a schematic cross-sectional view illustrating a rotary machine device according to a second embodiment of the present disclosure. FIG. 2B is a schematic block diagram illustrating the rotary machine device according to the second embodiment of the present disclosure. In the second embodiment, as shown in FIG. 2A and FIG. 2B, the rotary machine device 200 includes a rotary motor 21, a first encoder 22, a power transmission device 23, an exerting shaft 24, a fixed housing 25, a fixed shaft 26, an output shaft 27 and a second encoder 28. The output shaft 27 of the rotary machine device 200 is configured to contact with an external object (not shown). The rotary motor 21 rotates for a rotary angle to provide a first torque. The first encoder 22 detects the rotary angle of the rotary motor 21. The power transmission device 23 is connected to the rotary motor 21, and the power transmission device 23 increases the first torque to generate a second torque. Particularly, the power transmission device 23 reduces the angular acceleration and increases the torque according to a speed reduction ratio.

The exerting shaft 24 has a connection part 241, and the exerting shaft 24 is disposed on the housing of the power transmission device 23. The second torque generated by the power transmission device 23 drives the exerting shaft 24 to rotate for an exerting angle. The fixed housing 25 is connected to the housing of the power transmission device 23 and is around the exerting shaft 24. The fixed shaft 26 includes an accommodation hole 261, and the fixed shaft 26 is connected to the fixed housing 25 and is corresponding to the exerting shaft 24. The output shaft 27 includes an elastomer 271 and is inserted in the accommodation hole 261. The elastomer 271 is penetrated through the output shaft 27, and an end of the elastomer 271 is connected to the connection part 241 of the exerting shaft 24. The elastomer 271 is for example but not limited to be formed in one piece with the output shaft 27 or be rigidly connected to the output shaft 27. The second encoder 28 includes a disk 281 and a sensor 282. The disk 281 is disposed on the exerting shaft 24 and is around the connection part 241, and the sensor 282 is disposed on the fixed shaft 26. The sensor 282 is corresponding in space to the disk 281, and the sensor 282 detects the exerting angle of the exerting shaft 24 through the disk 281. The first encoder 22 and the second encoder 28 are for example but not limited to optical encoders or magnetic encoders. In the case that the output shaft 27 is not contacted with the external object, the exerting shaft 24 drives the output shaft 27 through the elastomer 271 to rotate for the exerting angle. When the output shaft 27 is contacted with the external object and is fixed, the end of the elastomer 271 reduces the exerting angle of the exerting shaft 24 to a stop angle.

In an embodiment, the power transmission device 23 is a decelerator, but not exclusively. Since the person skilled in the art can easily understand that the decelerator is used to increase the torque of the motor, the detailed descriptions about the operation principle of the power transmission device 23 are omitted in the present disclosure.

In an embodiment, the rotary machine device 200 further includes a controller 250, and the controller 250 is configured to sense the motor current of the rotary motor 21. The first encoder 22 detects the rotary angle of the rotary motor 21 and outputs a first position signal S21 to the controller 250 accordingly. The controller 250 calculates an angular acceleration of the rotary motor 21 according to the first position signal S21. The sensor 282 of the second encoder 28 detects the exerting angle and outputs a second position signal S22 to the controller 250 accordingly. Alternatively, the sensor 282 detects the stop angle and outputs a third position signal S23 to the controller 250 accordingly. If the controller 250 determines that the angular acceleration and the motor current are in direct proportion, the controller 250 determines that the output shaft 27 is not contacted with an external object, and the controller 250 records the second position signal S22 as an initial position of the exerting shaft 24. If the controller 250 determines that the angular acceleration does not increase as the motor current increases, the controller 250 knows that the output shaft 27 is affected by external force. Therefore, the controller 250 determines that the output shaft 27 is contacted with an external object, and the controller 250 records the third position signal S23 as a stop position of the exerting shaft 24. According to the difference between the initial position and the stop position, the controller 250 calculates the torsion value of the output shaft 27. The torsion value of the output shaft 27 equals the product of the elastic coefficient of the elastomer 271 and the difference between the initial and stop positions. The elastic coefficient of the elastomer 271 may be preset in the controller 250. If the controller 250 determines that the torsion value is higher than a safety threshold, the controller 250 reduces the rotary angle of the rotary motor 21 or stops operating the rotary motor 21 so as to protect the external object from being damaged by the excessive force from the rotary machine device 200.

Consequently, the force applied on the output shaft 27 can be sensed through disposing the elastomer 271 and the encoders 22 and 28, which is simpler for structure design and requires lower processing cost. Further, compared with the conventional approach of performing the force sense through attaching the strain gauge, it requires smaller space while disposing the elastomer 271 and encoders 22 and 28. In addition, the disk 281 and the sensor 282 of the second encoder 28 are disposed on the exerting shaft 24 and the fixed shaft 26 respectively, and only the sensor 282 has the wiring connected to the controller 250. Therefore, the exerting shaft 24 can rotate without being limited by the wiring.

In addition, when the distance between the output shaft 27 and the external object is larger than a default, the motor current and the angular acceleration are allowed to vary freely. However, when the distance between the output shaft 27 and the external object is smaller than the default, the output shaft 27 is prepared to contact with the external object, and the motor current and the angular acceleration should be limited within a smaller specific range.

In an embodiment, an outer diameter of the disk 281 is larger than an outer diameter of the elastomer 271, thereby causing the effect of enlarging the deformation of the elastomer 271. Therefore, it is easier to sense the deformation of the elastomer 271. Further, compared with the conventional approach of performing the force sense through attaching the strain gauge, the elastomer 271 of the present disclosure has better structure rigidity under the condition of same deformation.

The difference between the rotary machine device 200 and the rotary machine device 100 is the power transmission device 23. The principle about the controller calculating the torsion value of the output shaft of the rotary machine device 200 is the same as that of the rotary machine device 100, and thus the detailed descriptions thereof are omitted herein.

Figure 3A:
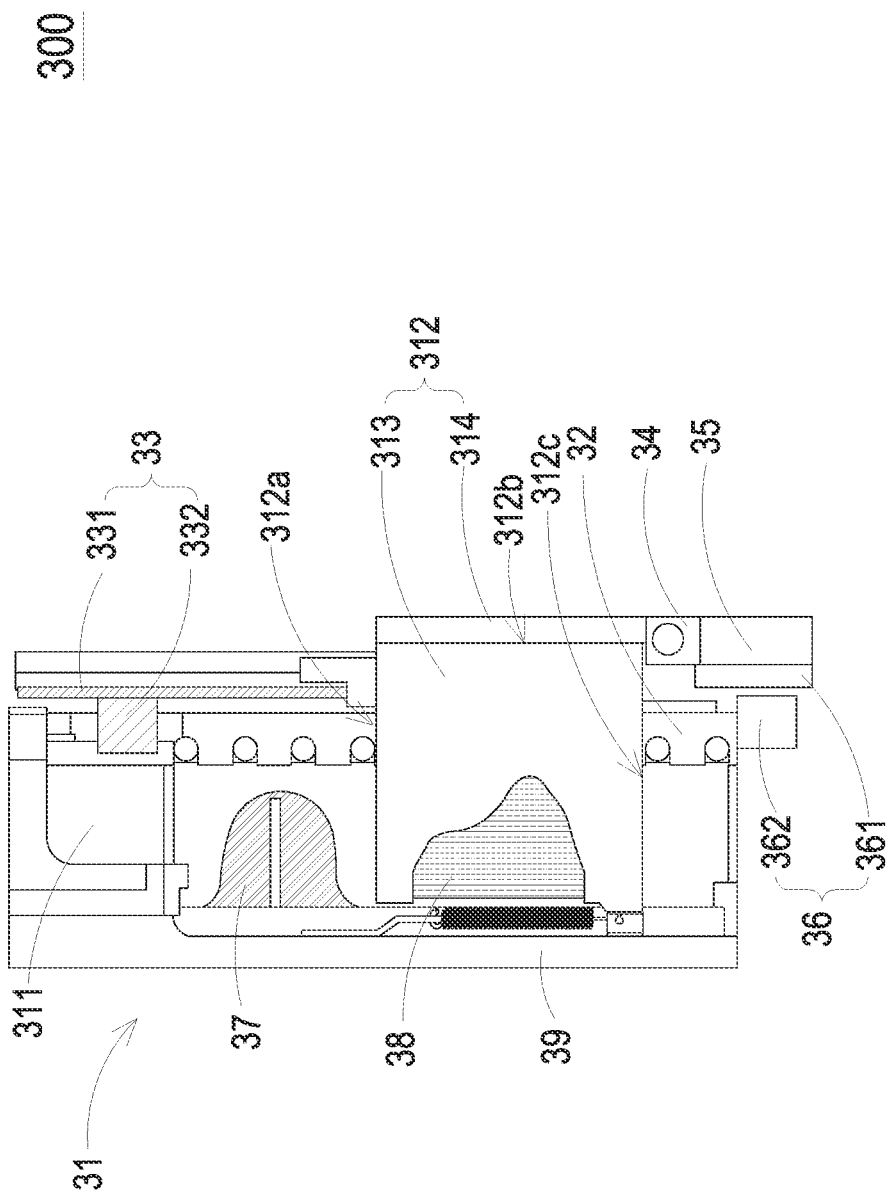
FIG. 3A is a schematic cross-sectional view illustrating a linear machine device according to a third embodiment of the present disclosure.
Figure 3B:
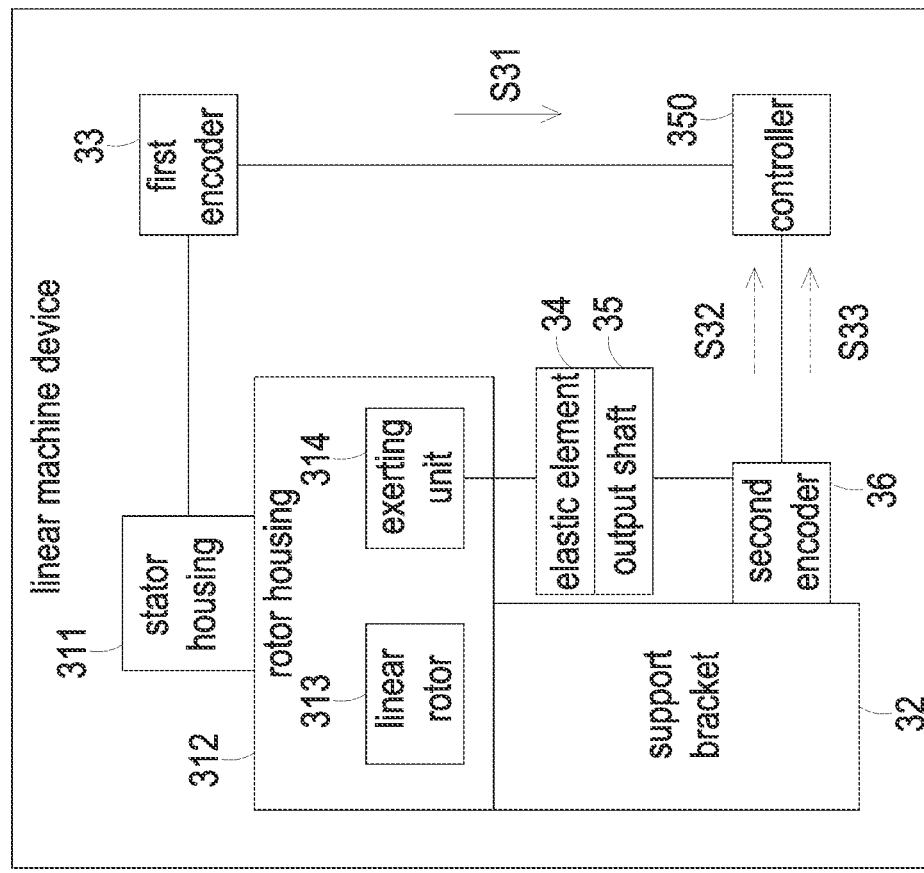
FIG. 3B is a schematic block diagram illustrating the linear machine device according to the third embodiment of the present disclosure.

FIG. 3A is a schematic cross-sectional view illustrating a linear machine device according to a third embodiment of the present disclosure. FIG. 3B is a schematic block diagram illustrating the linear machine device according to the third embodiment of the present disclosure. In the third embodiment, as shown in FIG. 3A and FIG. 3B, the linear machine device 300 includes a linear motor 31, a support bracket 32, a first encoder 33, an elastic element 34, an output shaft 35 and a second encoder 36. The output shaft 35 of the linear machine device 300 is configured to contact with an external object (not shown). The linear motor 31 includes a stator housing 311 and a rotor housing 312, and the stator housing 311 is connected to a first side 312a of the rotor housing 312. The rotor housing 312 includes a linear rotor 313 and an exerting unit 314, and the exerting unit 314 is disposed on a second side 312b of the rotor housing 312. The first side 312a of the rotor housing 312 is perpendicular in space to the second side 312b of the rotor housing 312. A third side 312c of the rotor housing 312 is partially attached on a surface of the support bracket 32 directly. The third side 312c of the rotor housing 312 is opposite in space to the first side 312a of the rotor housing 312 and is perpendicularly connected to the second side 312b of the rotor housing 312. The exerting unit 314 is not contacted with the said surface of the support bracket 32. When the linear rotor 313 moves a linear displacement, the linear rotor 313 drives the exerting unit 314 to move the linear displacement simultaneously. The linear displacement is perpendicular to the said surface of the support bracket 32. The first encoder 33 is connected to the stator housing 311 for detecting the linear displacement of the linear rotor 313, and the first encoder 33 includes a scale 331 and a sensor 332. A first end of the elastic element 34 is connected to the exerting unit 314, and a second end of the elastic element 34 is connected to a first end of the output shaft 35. The elastic element 34 is for example but not limited to be formed in one piece with the output shaft 35 or be rigidly connected to the output shaft 35. The second encoder 36 includes a scale 361 and a sensor 362. The scale 361 is disposed on the output shaft 35, and the sensor 362 is disposed on a side surface of the support bracket 32. The sensor 362 is corresponding in space to the scale 361, and the sensor 362 detects the displacement of the output shaft 35 through the scale 361. The first encoder 33 and the second encoder 36 are for example but not limited to optical encoders or magnetic encoders. In addition, the position of coil 37, magnet 38 and coil assembly main support 39 is exemplified in FIG. 3A for easily understanding the structure of the linear motor 31. When a second end of the output shaft 35 is not contacted with the external object, the exerting unit 314 drives the output shaft 35 through the elastic element 34 to move an output displacement. When the second end of the output shaft 35 is contacted with the external object, the elastic element 34 reduces the output displacement of the output shaft 35 to a stop displacement.

In an embodiment, the linear machine device 300 further includes a controller 350, and the controller 350 is configured to sense the motor current of the linear motor 31. The first encoder 33 detects the linear displacement of the linear rotor 313 and outputs a first position signal S31 to the controller 350 accordingly. The controller 350 calculates an acceleration of the linear rotor 313 according to the first position signal S31. The sensor 362 of the second encoder 36 detects the output displacement and outputs a second position signal S32 to the controller 350 accordingly. Alternatively, the sensor 362 detects the stop displacement and outputs a third position signal S33 to the controller 350 accordingly. If the controller 350 determines that the acceleration and the motor current are in direct proportion, the controller 350 determines that the output shaft 35 is not contacted with an external object, and the controller 350 records the second position signal S32 as an initial position of the output shaft 35. If the controller 350 determines that the acceleration does not increase as the motor current increases, the controller 350 knows that the output shaft 35 is affected by external force. Therefore, the controller 350 determines that the output shaft 35 is contacted with an external object, and the controller 350 records the third position signal S33 as a stop position of the output shaft 35. According to the difference between the initial position and the stop position, the controller 350 calculates the output value of the output shaft 35. The output value of the output shaft 35 equals the product of the elastic coefficient of the elastic element 34 and the difference between the initial and stop positions. The elastic coefficient of the elastic element 34 may be preset in the controller 350. If the controller 350 determines that the output value is higher than a safety threshold, the controller 350 reduces the linear displacement of the linear rotor 313 or stops operating the linear motor 31 so as to protect the external object from being damaged by the excessive force from the linear machine device 300.

Consequently, the force applied on the output shaft 35 can be sensed through disposing the elastic element 34 and the encoders 33 and 36, which is simpler for structure design and requires lower processing cost. Further, compared with the conventional approach of performing the force sense through attaching the strain gauge, it requires smaller space while disposing the elastic element 34 and encoders 33 and 36. In addition, the scale 361 and the sensor 362 of the second encoder 36 are disposed on the output shaft 35 and the support bracket 32 respectively, and only the sensor 362 has the wiring connected to the controller 350. Therefore, the output shaft 35 can move without being limited by the wiring.

In addition, when the distance between the output shaft 35 and the external object is larger than a default, the motor current and the acceleration are allowed to vary freely. However, when the distance between the output shaft 35 and the external object is smaller than the default, the output shaft 35 is prepared to contact with the external object, and the motor current and the acceleration should be limited within a smaller specific range.

Figure 4:
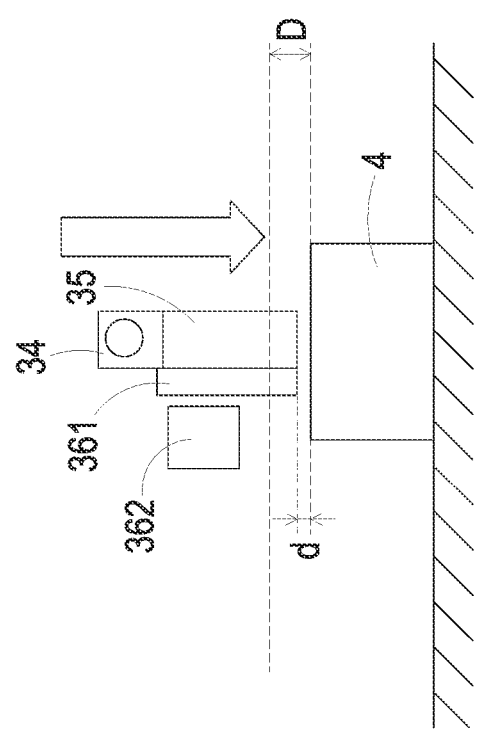
FIG. 4 is a schematic cross-sectional view illustrating a part of components of the linear machine device of FIG. 3A and an external object.
Figure 5:
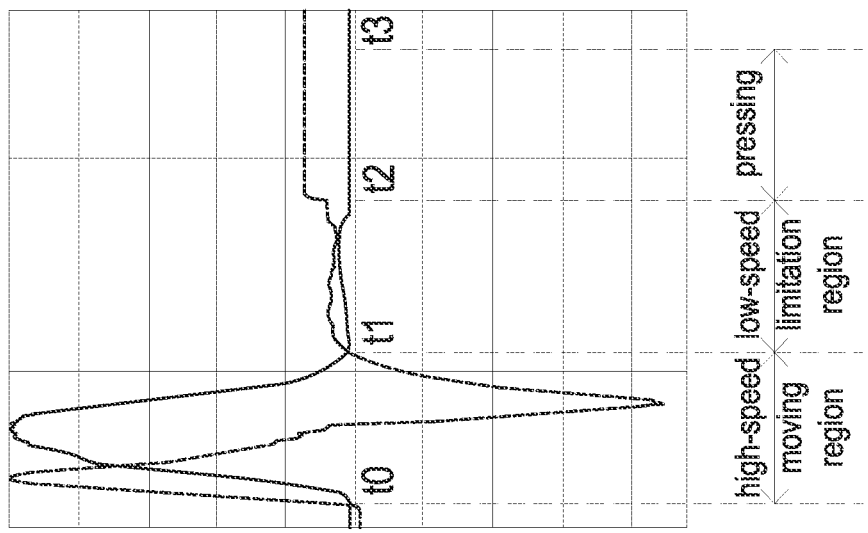
FIG. 5 is a schematic oscillogram showing the speed and current of the linear motor of the linear machine device of FIG. 3A.

Taking applying the linear machine device of the third embodiment in pressing operation, as shown in FIG. 4 and FIG. 5. The output shaft 35 in FIG. 4 is for example but not limited to a pressing jig tool. In FIG. 5, the solid line and the dashed line represent the velocity and current of the linear motor 31 respectively. During the time t0 to t1, the distance d between the output shaft 35 and the external object 4 is larger than the default D, and the linear motor 31 is in a high-speed moving region. When the distance d is much larger than the default, the velocity of the linear motor 31 may be increased to drive the output shaft 34 to move toward the external object 4 quickly. As the distance d becomes closer to the default D gradually, the velocity of the linear motor 31 is decreased gradually. During the time t1 to t2, the distance d is smaller than the default D, the linear motor 31 is in a low-speed limitation region. In the low-speed limitation region, the current and velocity of the linear motor 31 is smaller and have narrower variation range. At the time t2, the output shaft 35 is contacted with the external object 4, the current of the linear motor 31 increases, and the velocity of the linear motor 31 is fixed. During the time t2 to t3, the output shaft 35 performs the pressing operation, and the current and velocity of the linear motor 31 are kept constant. Namely, the acceleration of the linear motor 31 is fixed at zero. Further, in this period, the controller 350 determines that the output force is larger than a safety threshold and stops operating the linear motor 31.

In an embodiment, the elastomer 151, the elastomer 271 and the elastic element 34 are made of materials having ductility and malleability, such as metal (e.g., gold, silver, platinum, iron, nickel, copper, aluminum, zinc, tin, etc), compound metal or rubber, but not limited thereto.

From the above descriptions, the present disclosure provides a rotary machine device (100, 200) and a linear machine device 300. The force applied on the output shaft is sensed through disposing the elastomer and encoders, which is simpler for structure design and requires lower processing cost. Further, compared with the conventional approach of performing the force sense through attaching the strain gauge, the machine devices of the present disclosure require smaller space while disposing the elastomer and encoders. In addition, the disk or scale and the sensor of the second encoder are disposed on the exerting shaft and the fixed shaft or support bracket respectively, and only the sensor has the wiring connected to the controller. Therefore, the exerting shaft or output shaft can rotate or move without being limited by the wiring.

In addition, in the rotary machine devices 100 and 200 and the linear machine device 300 of the present disclosure, the elastomer and the elastic element are designed to be close to the external object contacted with the output shaft. Therefore, the second encoders 16, 28 and 36 can detect the torsion value or output value of the output shaft more accurately. Compared with the conventional approach of disposing the elastomer or elastic element far away from the external object contacted with the output shaft, the present disclosure has better accuracy.

It is easy for the person skilled in the art to dispose the controllers 150, 250 and 350 in the rotary machine devices 100 and 200 and the linear machine device 300 respectively. Therefore, in order to simplify the drawings, the controllers 150, 250 and 350 are schematically shown by block diagrams. The particular positions of the controllers 150, 250 and 350 being disposed in the rotary machine devices 100 and 200 and the linear machine device 300 are omitted.

While the disclosure has been described in terms of what is presently considered to be the most practical and preferred embodiments, it is to be understood that the disclosure needs not be limited to the disclosed embodiment.

What is claimed is:

1. A rotary machine device, configured to contact with an external object, the rotary machine device comprising:
    a rotary motor, comprising a motor housing and an exerting shaft, wherein the motor housing comprises a stator and a rotor, the exerting shaft comprises a connection part, the stator is connected to the rotor, the exerting shaft is disposed on the motor housing and is connected to the rotor, and the rotor drives the exerting shaft to rotate for an exerting angle when the rotor rotates for a rotary angle;
    a first encoder, disposed on the motor housing, connected to the stator, and configured to detect the rotary angle of the rotor;
    a fixed housing, connected to the motor housing and being around the exerting shaft;
    a fixed shaft, comprising an accommodation hole, wherein the fixed shaft is connected to the fixed housing and is corresponding to the exerting shaft;
    an output shaft, comprising an elastomer and inserted in the accommodation hole, wherein the elastomer is penetrated through the output shaft, and an end of the elastomer is connected to the connection part of the exerting shaft; and
    a second encoder, comprising a disk and a sensor, wherein the disk is disposed on the exerting shaft and is around the connection part, the sensor is disposed on the fixed shaft, the sensor is corresponding in space to the disk, and the sensor detects the exerting angle of the exerting shaft through the disk.

2. The rotary machine device according to claim 1, wherein when the output shaft is not contacted with the external object, the exerting shaft drives the output shaft through the elastomer to rotate for the exerting angle; and wherein when the output shaft is contacted with the external object and is fixed, the end of the elastomer reduces the exerting angle of the exerting shaft to a stop angle.

3. The rotary machine device according to claim 2, further comprising a controller configured to sense a motor current of the rotary motor;
    wherein the first encoder detects the rotary angle of the rotor and outputs a first position signal to the controller accordingly, and the controller calculates an angular acceleration of the rotor according to the first position signal;

wherein the sensor of the second encoder detects the exerting angle or the stop angle and outputs a second position signal or a third position signal to the controller accordingly.

4. The rotary machine device according to claim 3, wherein if the controller determines that the angular acceleration and the motor current are in direct proportion, the controller determines that the output shaft is not contacted with the external object, and the controller records the second position signal as an initial position of the exerting shaft.

5. The rotary machine device according to claim 4, wherein if the controller determines that the angular acceleration does not increase as the motor current increases, the controller determines that the output shaft is contacted with the external object, and the controller records the third position signal as a stop position of the exerting shaft.

6. The rotary machine device according to claim 5, wherein the controller calculates a torsion value of the output shaft according to a difference between the initial position and the stop position.

7. The rotary machine device according to claim 6, wherein if the controller determines that the torsion value is higher than a safety threshold, the controller reduces the rotary angle of the rotor or stops operating the rotary motor.

8. A rotary machine device, configured to contact with an external object, the rotary machine device comprising:
   a rotary motor, rotating for a rotary angle to provide a first torque;
   a first encoder, detecting the rotary angle of the rotary motor;
   a power transmission device, connected to the rotary motor, wherein the power transmission device increases the first torque to generate a second torque;
   an exerting shaft, comprising a connection part, wherein the exerting shaft is disposed on a housing of the power transmission device, and the second torque generated by the power transmission device drives the exerting shaft to rotate for an exerting angle;
   a fixed housing, connected to the housing of the power transmission device and being around the exerting shaft;
   a fixed shaft, comprising an accommodation hole, wherein the fixed shaft is connected to the fixed housing and is corresponding to the exerting shaft;
   an output shaft, comprising an elastomer and inserted in the accommodation hole, wherein the elastomer is penetrated through the output shaft, and an end of the elastomer is connected to the connection part of the exerting shaft; and
   a second encoder, comprising a disk and a sensor, wherein the disk is disposed on the exerting shaft and is around the connection part, the sensor is disposed on the fixed shaft, the sensor is corresponding in space to the disk, and the sensor detects the exerting angle of the exerting shaft through the disk.

9. The rotary machine device according to claim 8, wherein when the output shaft is not contacted with the external object, the exerting shaft drives the output shaft through the elastomer to rotate for the exerting angle; and wherein when the output shaft is contacted with the external object and is fixed, the end of the elastomer reduces the exerting angle of the exerting shaft to a stop angle.

10. The rotary machine device according to claim 9, further comprising a controller configured to sense a motor current of the rotary motor;
   wherein the first encoder detects the rotary angle of the rotary motor and outputs a first position signal to the controller accordingly, and the controller calculates an angular acceleration of the rotary motor according to the first position signal;
   wherein the sensor of the second encoder detects the exerting angle or the stop angle and outputs a second position signal or a third position signal to the controller accordingly.

11. The rotary machine device according to claim 10, wherein if the controller determines that the angular acceleration and the motor current are in direct proportion, the controller determines that the output shaft is not contacted with the external object, and the controller records the second position signal as an initial position of the exerting shaft.

12. The rotary machine device according to claim 11, wherein if the controller determines that the angular acceleration does not increase as the motor current increases, the controller determines that the output shaft is contacted with the external object, and the controller records the third position signal as a stop position of the exerting shaft; and wherein the controller calculates a torsion value of the output shaft according to a difference between the initial position and the stop position.

13. The rotary machine device according to claim 8, wherein an outer diameter of the disk is larger than an outer diameter of the elastomer.

14. The rotary machine device according to claim 8, wherein elastomer and the output shaft are formed in one piece or are rigidly connected.

15. A linear machine device, configured to contact with an external object, the linear machine device comprising:
   a linear motor, comprising a stator housing and a rotor housing, wherein the stator housing is connected to a first side of the rotor housing, the rotor housing comprising a linear rotor and an exerting unit, the exerting unit is disposed on a second side of the rotor housing, and the first side is perpendicularly connected to the second side;
   a support bracket, wherein a third side of the rotor housing is partially attached on a surface of the support bracket directly, the exerting unit is not contacted with the surface of the support bracket, the linear rotor drives the exerting unit to move a linear displacement simultaneously when the linear rotor moves the linear displacement, the linear displacement is perpendicular to the surface of the support bracket, the third side is perpendicularly connected to the second side, and the third side is opposite to the first side;
   a first encoder, connected to the stator housing for detecting the linear displacement of the linear rotor;
   an elastic element, wherein a first end of the elastic element is connected to the exerting unit;
   an output shaft, wherein a first end of the output shaft is connected to a second end of the elastic element; and
   a second encoder, comprising a scale and a sensor, wherein the scale is disposed on the output shaft, the sensor is disposed on a side surface of the support bracket, the sensor is corresponding in space to the scale, and the sensor detects a displacement of the output shaft through the scale.

16. The linear machine device according to claim 15, wherein when a second end of the output shaft is not contacted with the external object, the exerting unit drives the output shaft through the elastic element to move an output displacement; and wherein when the second end of the output shaft is contacted with the external object, the elastic element reduces the output displacement of the output shaft to a stop displacement.

17. The linear machine device according to claim 16, further comprising a controller configured to sense a motor current of the linear motor;
- wherein the first encoder detects the linear displacement of the linear rotor and outputs a first position signal to the controller accordingly, and the controller calculates an acceleration of the linear rotor according to the first position signal;
- wherein the sensor of the second encoder detects the output displacement or the stop displacement and outputs a second position signal or a third position signal to the controller accordingly.

18. The linear machine device according to claim 17, wherein if the controller determines that the acceleration and the motor current are in direct proportion, the controller determines that the output shaft is not contacted with the external object, and the controller records the second position signal as an initial position of the output shaft.

19. The linear machine device according to claim 18, wherein if the controller determines that the acceleration does not increase as the motor current increases, the controller determines that the output shaft is contacted with the external object, and the controller records the third position signal as a stop position of the output shaft.

20. The linear machine device according to claim 19, wherein the controller calculates an output value of the output shaft according to a difference between the initial position and the stop position.

* * * * *